United States Patent [19]

Schütze et al.

[11] Patent Number: 4,555,580
[45] Date of Patent: Nov. 26, 1985

[54] PROCESS FOR THE PREPARATION OF THIOINDIGO COMPOUNDS

[75] Inventors: Detlef-Ingo Schütze, Bergisch-Gladbach; Reinold Schmitz, Odenthal; Klaus Wunderlich, Leverkusen, all of Fed. Rep. of Germany

[73] Assignee: Bayer Aktiengesellschaft, Leverkusen, Fed. Rep. of Germany

[21] Appl. No.: 535,543

[22] Filed: Sep. 26, 1983

Related U.S. Application Data

[63] Continuation of Ser. No. 367,694, Apr. 12, 1982, abandoned.

[30] Foreign Application Priority Data

Apr. 29, 1981 [DE] Fed. Rep. of Germany ....... 3117055

[51] Int. Cl.[4] .......................................... C07D 333/24
[52] U.S. Cl. ........................................ 549/52; 549/45
[58] Field of Search .................................. 549/52, 45

[56] References Cited

FOREIGN PATENT DOCUMENTS 467447 6/1937 United Kingdom .
692962 6/1953 United Kingdom .

Primary Examiner—Alan Siegel
Attorney, Agent, or Firm—Sprung Horn Kramer & Woods

[57] ABSTRACT

Process for the preparation of thioindigo compounds of the formula

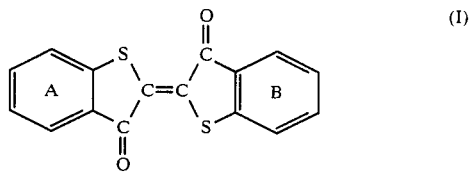

in which
A and B designate identical or different, optionally substituted benzene rings or benzene rings to which further carbocyclic and heterocyclic rings can be fused,
characterized in that compounds of the formula

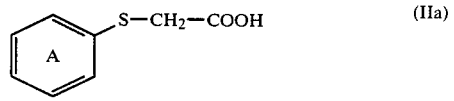

and/or

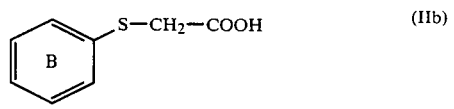

in which
A and B have the abovementioned meaning, are reacted in a mixture of chlorosulphonic acid and a further halide of an inorganic acid and, if appropriate, the resulting reaction product is oxidized in a manner which is in itself known and the batch is worked up to give compounds of the formula (I).

15 Claims, No Drawings

PROCESS FOR THE PREPARATION OF THIOINDIGO COMPOUNDS

This application is a continuation of application Ser. No. 367,694, filed Apr. 12, 1982 now abandoned.

The invention relates to an improved process for the preparation of thioindigo compounds by reacting arylthioglycolic acids in a reaction mixture consisting of chlorosulphonic acid and a halide of an inorganic acid, such as, for example, thionyl chloride, sulphuryl chloride, phosphorus oxychloride, phosphorus(V) chloride, phosphorus(III) chloride, disulphur dichloride or the like, at temperatures between $-10°$ C. and $+35°$ C. The resulting reaction product is then, if appropriate, oxidised in a manner which is in itself known.

Processes for the preparation of thioindigo compounds in chlorosulphonic acid have been known for decades. Symmetrical thioindigo compounds are already obtained in German Patent Specification No. 241,910 by reacting substituted arylthioglycolic acids with chlorosulphonic acid at 35° C.

In another process, described in German Offenlegungsschrift No. 2,457,703, 2,5-dichlorophenylthioglycolic acid is reacted in chlorosulphonic acid and the resulting reaction product is then completely oxidised with air to give 4,4',7,7'-tetrachlorothioindigo.

Russian Patent Specification No. 327,218 (referred to in German Offenlegungsschrift No. 2,457,703) also mentions a process in which, for example, 2,5-dichlorophenylthioglycolic acid is reacted with chlorosulphonic acid only to the stage of 3-hydroxy-4,7-dichloro-1-thionaphthene. This intermediate product is isolated and oxidised with sodium polysulphide to give a tetrachlorothioindigo.

Furthermore, German Patent Specification No. 243,087 discloses a process in which arylthioglycolic acids are reacted in chlorosulphonic acid. To complete the reaction to give thioindigo compounds, for example nitrobenzene is added.

Processes have also been described (German Patent Specification Nos. 246,265 and 248,264) in which symmetrically substituted thioindigo derivatives are obtained by reacting substituted arylthioglycolic acids in monohydrated or concentrated sulphuric acid. All these processes have the disadvantage that they produce more than one product due to secondary reactions and therefore have only limited use. In addition, some of these processes only achieve insufficient yields.

It has now been found, surprisingly, that thioindigo and its derivatives are obtained in very high yields and in a high degree of purity if arylthioglycolic acids are reacted in a mixture of chlorosulphonic acid and a halide of an inorganic acid, preferably a halide of a sulphur- or phosphorus-containing inorganic acid, for example thionyl chloride, sulphuryl chloride, phosphorus oxychloride, phosphorus(V) chloride, phosphorus(III) chloride, disulphur dichloride or the like. The resulting reaction product is isolated and, if appropriate, oxidised in a manner which is in itself known and worked up to give expected thioindigo derivatives. Thioindigo compounds which can be obtained according to the invention can be represented by the formula

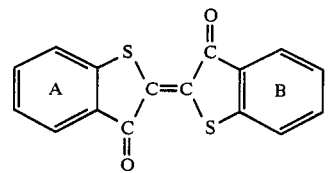

in which

A and B designate identical or different, optionally substituted benzene rings or benzene rings to which further carbocyclic or heterocyclic rings are fused.

Starting materials for their preparation are compounds of the formula

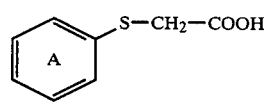

and/or

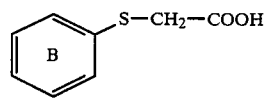

in which

A and B have the abovementioned meaning and which are reacted in a mixture of chlorosulphonic acid and a further halide of an inorganic acid.

By a suitable choice of the acid halide and of the duration of the reaction it is possible to obtain directly a particular thioindigo derivative, the corresponding 3-hydroxy-1-thionaphthene derivative or a mixture consisting of the thioindigo derivative and the corresponding 3-hydroxy-1-thionaphthene derivative. The two last-mentioned are then oxidised completely in a manner which is in itself known (see, for example, also German Offenlegungsschrift No. 2,457,703) and the batch is worked up to give a compound of the formula (I).

The process is particularly suitable for the preparation of compounds of the formula (I), in which A and B designate benzene rings which are unsubstituted or carry 1, 2, 3 or 4 substituents from the series comprising halogen, nitro, trifluoromethyl, alkyl, alkoxy, aryloxy, acylamino, alkylmercapto or —COR, in which R represents alkyl, aryl, alkoxy or optionally substituted amino, or also for the preparation of compounds of the formula (I) in which a carbocyclic or heterocyclic-aromatic ring is fused to rings A and B, which may be carrying 1 to 2 substituents.

Those compounds of the formula (I) can be prepared particularly smoothly in which rings A and B carry 1, 2, 3 or 4 substituents from the series comprising chlorine, bromine, nitro or $C_1$–$C_4$-alkoxy or in which benzene rings A and B are part of an α- or a β-naphthyl ring.

The new process is of particular interest for the preparation of a tetrachlorothioindigo of the structure

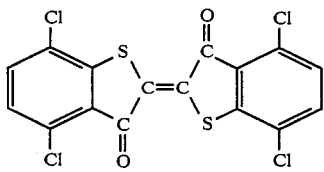

Starting compounds of the formulae (IIa) and (IIb) used in carrying out the process are known in the literature or can be prepared by a method analogous to methods known in the literature.

The amounts and the mixing ratios of chlorosulphonic acid and the halide of an inorganic acid can vary within wide ranges.

For example, per 1 mol of arylthioglycolic acid, 5–30 mols of chlorosulphonic acid, preferably 10–25 mols, and 0.5–3 mols, preferably 1–2.5 mols, of the acid halide to be used are employed.

The reaction temperature is within the range from about $-10°$ C. to about $+35°$ C., preferably within the range from about $0°$ C. to about $+10°$ C.

In practice the process is carried out by adding at an indicated reaction temperature an arylthioglycolic acid to a mixture of chlorosulphonic acid and an acid halide.

Times for the reaction are then chosen depending on the type of arylthioglycolic acid and are between 2 and 20 hours. The reaction mixture is then discharged onto ice water, filtered off with suction and washed with water. The water-moist isolated product, depending on the reaction conditions used, can then consist of 1. a pure thioindigo derivative,
2. a mixture of a thioindigo derivative and the corresponding 3-hydroxyl-1-thionaphthene or
3. a pure 3-hydroxy-1-thionaphthene derivative (preferentially on using chlorosulphonic acid and phosphorus(III) chloride).

In the first case the product obtained can be used directly as a vat dyestuff or pigment after it has been isolated and dried.

However, if the product also contains a 3-hydroxy-1-thionaphthene (case 2 and 3), it is then stirred directly into water which has been made alkaline by the addition of bases, such as sodium hydroxide, potassium hydroxide, sodium carbonate, ammonia or barium hydroxide, and oxidased.

This is preferably carried out at a pH between 9 and 14. The oxidation can be carried out here with oxygen, oxygen-containing gases, for example air, potassium dichromate, sodium polysulphide, iron(III) salt complexes, ammonium peroxodisulphate, potassium permanganate or other oxidising agents.

In addition to water the oxidation can also be carried out in an aqueous organic phase, such as water/pyridine, water/ethoxyethanol, water/ethanol, water/diethylene glycol monoethyl ether or the like.

The oxidation is usually carried out at temperatures between 10° C. and the boiling point of the mixture, preferably at 50° C. to 100° C.

If the oxidation is carried out with oxygen or air, catalysts, such as metal salts, metal oxides or metal hydroxides, which contain a transition metal, for example copper, cobalt, manganese or iron, as the metal, can be used to accelerate the oxidation reaction.

After the oxidation, whose progress can be monitored by following the drop in the amount of the intermediate product 3-hydroxy-1-thionaphthene present, for example by chromatography or by measuring the redox potential, is complete, the reaction product is isolated in a customary manner by filtering it off with suction and washing the filtered material retained with water.

In the case of pigments, the reaction mixture can be stirred during the oxidation or thereafter with the addition of an emulsifier or dispersing agent in order to achieve optimum pigment properties.

This second reaction variant, that is to say isolation of a reaction mixture of a thioindigo derivative and the corresponding 3-hydroxy-1-thionaphthene followed by an oxidation, is therefore also particularly suitable for the preparation of thioindigo compounds having pigment properties, such as, for example, tetrachlorothioindigo.

A further process variant for the preparation of thioindigo pigments which are particularly suitable for the mass-dyeing of plastics, such as, for example, PVC, polyacrylonitrile, polypropylene, polyethylene or cellulose derivatives, consists in converting a thioindigo derivative, by the addition of sodium dithionite after the oxidation with air is complete, into its leuco compound, which, if appropriate, is isolated, freshly suspended in water with the addition of a sodium hydroxide solution, to which suspension a surface-active agent may be added, and again oxidised with air. In order to coat the pigment with the surface-active agent, an acidification is then carried out, and the pigment is isolated and dried.

Examples of suitable surface-active agents are abietic acid and abietic acid derivatives, colophony and its derivatives, $C_{13}$- to $C_{18}$-paraffindisulphonic acids or the like.

The quantity of these materials is 0.1 to 20, preferably 5 to 15% by weight, relative to the pigment.

Pigments thus obtained are distinguished by their high colour intensity, very good dispersibility and a high fastness level.

Thioindigo compounds which can be obtained by the process according to the invention are used as dyestuffs for the most diverse areas of application and substrates.

In particular halogeno-substituted thioindigo derivatives are intense, brilliant pigments having excellent fastness properties, and although the valuable pigment properties of these products can also be achieved by subsequent finishing methods, this new process produces directly pigments of high purity and excellent colouristic pigment properties even directly.

The obtainable dyestuffs are also particularly suitable for use as vat dyestuffs for dyeing cotton.

The process according to the invention makes it possible to obtain thioindigo compounds having a high degree of purity in a smooth reaction and in high yields.

EXAMPLE 1

50 g of 2,5-dichlorophenylthioglycolic acid are added at 0° C. to a mixture of 250 ml of chlorosulphonic acid and 30 ml of thionyl chloride. The batch is then stirred for 5 hours at 0° C. The reaction mixture is then discharged onto 1250 ml of ice water, the mixture is stirred for 30 minutes, the product is filtered off with suction and washed until neutral to Congo red.

The moist press cake, which is composed of a mixture of 4,4',7,7'-tetrachlorothioindigo and 4,7-dichloro-3-hydroxythionaphthene, is then stirred into 310 ml of water and the resulting mixture is made alkaline with 62 g of 50% strength sodium hydroxide solution. After the addition of 4.2 g of crystalline iron(III) chloride an oxidation is carried out for about 6 hours at 80° C. by passing through about 20 l of air per hour. The mixture is then cooled down to 60° C., acidified with 76 ml of 35% strength hydrochloric acid, filtered off with suction and the product is washed with water until neutral and dried. 37.7 g (82.4% of theory) of a red-violet powder are obtained. It is a very intense pigment, which on incorporation into stoving lacquers produces a lacquer having very good flow.

EXAMPLE 2

A procedure analogous to the procedure of Example 1 is followed, but after an oxidation with air has been carried out for 6 hours 24 g of sodium dithionite are added directly and the resulting mixture is stirred for one hour at 60° C. The resulting leuco compound of the tetrachlorothioindigo is then filtered off with suction and washed with a little water. The moist press cake is then suspended in 1,000 ml of water to which 62 g of a 50% strength sodium hydroxide solution have been added. 4 g of abietic acid are then added and a further oxidation with air was carried out at 75°–80° C. in the course of about 5 hours. The mixture is then acidified with 94 ml of hydrochloric acid, stirred for ½ hour at 70° C., and the product was filtered off with suction, washed until neutral and dried.

38.9 g of a red-violet powder are obtained, which is very readily dispersible in, for example, PVC and has a high colour intensity and brilliance.

EXAMPLE 3

25 g of 2,5-dichlorophenylthioglycolic acid are added at 5° C. to a mixture of 120 ml of chlorosulphonic acid and 20 ml of sulphuryl chloride. The reaction mixture is then stirred for 4 hours at 5° C. It is then stirred into 800 ml of ice water, and the product is filtered off with suction after 30 minutes and washed with water until neutral to Congo Red.

The moist press cake, which is composed of a mixture of 4,4',7,7'-tetrachlorothioindigo and 4,7-dichloro-3-hydroxy-thionaphthene is stirred into 155 ml of water and the resulting mixture is made alkaline with 31 g of 50% strength sodium hydroxide solution. An oxidation is then carried out for 30 minutes at 40°–42° C. by the addition of a solution of 4.3 g potassium permanganate in 130 ml of water. After the oxidation is complete, the mixture is heated to 95°–100° C. during one hour and stirred at this temperature for a further 2 hours. It is then cooled to 70° C., and its pH is adjusted to 1 by means of 48 ml of 36% strength hydrochloric acid, and 2.4 g of oxalic acid are added. After 15 minutes the product is filtered off with suction, washed until neutral and dried. 19.4 g (84.8% of theory) of a red-violet powder are obtained. It is a very pure, intense pigment, which, in stoving lacquers, produces colourations having a high translucence and brilliance.

EXAMPLE 4

25 1 g of 2,5-dichlorophenylthioglycolic acid are added at 5° C. to a mixture of 125 ml of chlorosulphonic acid and 15 ml of thionyl chloride and the resulting mixture is then stirred for 15 hours at this temperature. The melt is then stirred into 650 ml of ice water. After stirring has been carried out for a further 30 minutes, the product is filtered off with suction and washed with water until neutral to Congo Red.

The moist press cake which is 4,4',7,7'-tetrachlorothioindigo is stirred into 180 ml of water which has been made alkaline with 31 g of 50% strength of sodium hydroxide solution, and the resulting mixture is heated to 70° C. After a further 30 minutes' stirring the pH is adjusted to 1 with the aid of 35 ml of 36% strength hydrochloric acid and the mixture is stirred for 60 minutes at 70° C. after the addition of 0.2 g of a commercially available dispersing agent. The product is then filtered off with suction, washed with water until neutral and dried. 18.8 g (82% theory) of a red-violet powder having good pigment properties are obtained.

EXAMPLE 5

25 g of 2,5-dichlorophenylthioglycolic acid are added at 0° C. to a mixture of 125 ml of chlorosulphonic acid and 19 ml of phosphorus(III) chloride. The mixture is then stirred for 8 hours at 0° C. The melt is then stirred into 700 ml of ice water and the product is filtered off with suction after 30 minutes and washed with water until neutral to Congo Red.

The moist press cake, which is 4,7-dichloro-3-hydroxy-1-thionaphthene, is then stirred into 180 of water, which has been made alkaline with 31 g of 50% strength sodium hydroxide solution. After the addition of 2.1 g of crystalline iron(III) chloride oxidation is carried out for about 8 hours at 80° C. by passing through about 20 liters of air per hour.

After the mixture has been heated at 95°–100° C. for a further 2 hours, the product is filtered off hot with suction, washed with hot sodium hydroxide solution and thereafter washed with water until neutral.

The moist filter cake is stirred into 800 ml of water/20 ml of 35% strength hydrochloric acid, and the mixture is heated to 70° C. and stirred for ½ hour at this temperature after the addition of 0.3 g of a commercially available dispersing agent. The product is then filtered off with suction, washed with water and dried. 17.4 (76% of theory) of a red-violet powder are obtained, which is a very intense pigment having a good fastness level.

EXAMPLE 6

12.5 g of 4-chlorophenylthioglycolic acid are added at 0° C. to a mixture of 60 ml of chlorosulphonic acid and 7 ml of thionyl chloride and the mixture is stirred for 3 hours at this temperature. The reaction mixture is then stirred into 300 ml of ice water and, after a further 30 minutes' stirring, the product is filtered off with suction, washed with water until neutral and dried. 10.1 (89.7% of theory) of a violet powder are obtained, which dyes cotton in violet shades from its vat.

The dyestuffs of Examples 7–11 were prepared analogously to Examples 1–5 and are pigments having very good properties:

| Example | Thioglycolic acid | Shade |
|---------|-------------------|-------|
| 7 | 2-chlorophenylthioglycolic acid | red-violet |
| 8 | 2-methyl-5-chlorophenylthioglycolic acid | red-violet |
| 9 | 2-methyl-4-chlorophenylthioglycolic acid | red-violet |
| 10 | 2,5-dimethyl-4-chlorophenylthioglycolic acid | red-violet |
| 11 | 3-methyl-5-chlorophenylthioglycolic acid | bluish-tinged red |

The dyestuffs of Examples 12–22 were prepared analogously to Example 6 and are vat dyestuffs:

| Example | Thioglycolic acid | Shade |
|---|---|---|
| 12 | 3-chlorophenylthioglycolic acid | red |
| 13 | 3-methylphenylthioglycolic acid | red |
| 14 | 2-methylphenylthioglycolic acid | bluish-tinged red |
| 15 | 4-methylphenylthioglycolic acid | bluish-tinged red |
| 16 | 2,4-dichlorophenylthioglycolic acid | red-violet |
| 17 | 2,4-dichloro-5-methylphenyl-thioglycolic acid | red-violet |
| 18 | 4-nitrophenylthioglycolic acid | greenish-tinged blue |
| 19 | 4-methoxyphenylthioglycolic acid | bluish |
| 20 | 3-ethoxyphenylthioglycolic acid | yellow-red |
| 21 | α-naphthylthioglycolic acid | blue-grey |
| 22 | β-naphthylthioglycolic acid | brown |

We claim:

1. Process for the preparation of thioindigo compounds of the formula

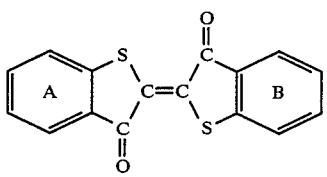

in which

A and B designate identical or different, optionally substituted benzene rings or benzene rings to which further carbocyclic and heterocyclic rings can be fused, characterised in that compounds of the formula

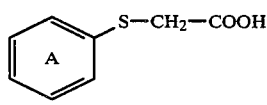

and/or

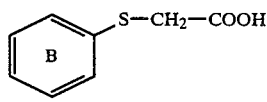

in which

A and B have the abovementioned meaning, are reacted in a mixture of chlorosulphonic acid and a further halide of an inorganic acid, and the resulting reaction product is oxidised in a manner which is in itself known and the batch is worked up to give compounds of the formula (I).

2. Process according to claim 1, characterised in that a halide of a sulphur-containing inorganic acid is used as an acid halide.

3. Process according to claim 1, characterised in that a halide of a phosphorus-containing inorganic acid is used as an acid halide.

4. Process according to claim 1, characterised in that thionyl chloride, sulphuryl chloride, phosphorus oxychloride, phosphorus(V) chloride, phosphorus(III) chloride or disulphur dichloride are used as a halide of an inorganic acid.

5. Process according to claim 1, characterised in that per 1 mol of an arylthioglycolic acid 5 to 30 mols of chlorosulphonic acid and 0.5 to 3 mols of a halide of an inorganic acid are used.

6. Process according to claim 1, characterised in that the reaction is carried out at about $-10°$ C. to about $+35°$ C., preferably at about $0°$ C. to about $+10°$ C.

7. A process according to claim 1, wherein the compound of the formula (IIa) is 2,5-dichlorophenylthioglycolic acid.

8. A process according to the claim 1, wherein the compound of the formula (IIb) is 2,5-dichlorophenylthioglycolic acid.

9. A process according to the claim 7, wherein the compound of the formula (IIb) is 2,5-dichlorophenylthioglycolic acid.

10. A process according to claim 1, wherein said halide of an inorganic acid is thionyl chloride, sulphuryl chloride, phosphorus oxychloride, phosphorus(V) chloride, or disulphur dichloride.

11. A process according to claim 1, wherein said halide of an inorganic acid is sulphuryl chloride, phosphorus oxychloride, or disulphur dichloride.

12. A process according to claim 1, wherein said halide of an inorganic acid is sulphuryl chloride, or disulphur dichloride.

13. A process according to claim 1 wherein said halide of an inorganic acid is thionyl chloride.

14. A process according to claim 1 wherein said halide of an inorganic acid is sulphuryl chloride.

15. A process according to claim 1 wherein said halide of an inorganic acid is phosphorus (III) chloride.

* * * * *

UNITED STATES PATENT AND TRADEMARK OFFICE
CERTIFICATE OF CORRECTION

PATENT NO. : 4,555,580

DATED : November 26, 1985

INVENTOR(S) : Detlef-Ingo Schütze, et al.

It is certified that error appears in the above-identified patent and that said Letters Patent is hereby corrected as shown below:

| | |
|---|---|
| Col. 3, line 34 | Delete "3-hydroxyl-1-" and substitute -- 3-hydroxy-1- -- |
| Col. 3, line 46 | Delete "oxidased" and substitute --oxidised-- |
| Col. 5, line 61 | After "25" delete "1" |
| Col. 7, line 36 | Delete "characterised in that" and substitute --consists essentially of reacting-- |
| Col. 8, lines 1,2 | Delete "are reacted in" and substitute --with-- |

Signed and Sealed this

Twelfth Day of August 1986

[SEAL]

Attest:

Attesting Officer

DONALD J. QUIGG

Commissioner of Patents and Trademarks